(12) United States Patent  
Do et al.

(10) Patent No.: US 8,909,799 B2
(45) Date of Patent: Dec. 9, 2014

(54) FILE SYSTEM FIREWALL

(75) Inventors: Phuc Ky Do, Morrisville, NC (US);
Justin M. Pierce, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 11/457,378

(22) Filed: Jul. 13, 2006

(65) Prior Publication Data

US 2008/0016212 A1 Jan. 17, 2008

(51) Int. Cl.
*G06F 15/16* (2006.01)
*H04L 29/06* (2006.01)

(52) U.S. Cl.
CPC ........ *H04L 63/0245* (2013.01); *H04L 63/0263* (2013.01)
USPC ................ 709/229; 709/225; 726/1; 713/165

(58) Field of Classification Search
CPC ........................ H04L 63/0263; H04L 63/0245
USPC .................................................. 709/229, 225
See application file for complete search history.

(56) References Cited

U.S. PATENT DOCUMENTS

| 4,864,616 | A | 9/1989 | Pond et al. | |
|---|---|---|---|---|
| 2001/0025311 | A1* | 9/2001 | Arai et al. | 709/225 |
| 2003/0084334 | A1* | 5/2003 | Miyao et al. | 713/200 |
| 2003/0084348 | A1* | 5/2003 | Miyao et al. | 713/201 |
| 2003/0115147 | A1 | 6/2003 | Feldman et al. | |
| 2005/0251508 | A1 | 11/2005 | Shimizu | |
| 2006/0161966 | A1* | 7/2006 | Nagampalli et al. | 726/1 |
| 2006/0218165 | A1* | 9/2006 | Vries et al. | 707/100 |

FOREIGN PATENT DOCUMENTS

| CN | 1555523 A | 12/2004 |
|---|---|---|
| CN | 1606011 A | 4/2005 |
| JP | 06138969 | 5/1994 |
| JP | 2005310041 | 11/2005 |

OTHER PUBLICATIONS

Steven Bade, et al; Method of Restricting Access to Inter Process Communications Mechanisms Using Public Key Cryptography; RD n 431 Mar. 2000, Article 132, p. 547.
Camillone, et al; Extensible Access Control List Mechanism; TDB n7B Dec. 1991 p. 114-117.
Lennon, et al; Public Key Enciphering/Deciphering Transformations Using a Conventional Algorithm; TDB Aug. 1982 p. 1241-1249.

* cited by examiner

*Primary Examiner* — Arvin Eskandarnia
(74) *Attorney, Agent, or Firm* — Steven M. Greenberg, Esq.; CRGO Law

(57) ABSTRACT

Embodiments of the invention address deficiencies of the art in respect to file system access and provide a method, system and apparatus for a file system firewall. In one embodiment of the invention, a data processing system configured for file system access can be provided. The data processing system can include a file system, an operating system, a set of access rules, each of the access rules having an associated rule key, and a file system firewall disposed between the file system and the operating system. The file system firewall can include program code enabled to permit or deny a file system request according to an access rule in the set of access rules associated with a rule key formed from an application based attribute in the file system request.

19 Claims, 2 Drawing Sheets

FILE SYSTEM FIREWALL

BACKGROUND OF THE INVENTION

1. Field of the Invention

The present invention relates to the field of computing security and more particular to file system security.

2. Description of the Related Art

Computing security has increasingly become the focus of information technologists who participate in locally and globally accessible computer networks. In particular, with the availability and affordability of network computing, even within the small enterprise, many computers and small computer networks provide access to a substantial number of end users continuously. Notwithstanding, the efficiencies gained, network computing is not without its price. Specifically, those computers and computer networks which heretofore had remained disconnected from the security risks of the Internet now have become the primary target of malicious Internet hackers, crackers and script kiddies, collectively referred to as "malicious hackers".

Computing networks incorporate gateway switches to regulate the ingress and egress of information into different segments of the network. Firewall technologies have been deployed in association with gateway switches in order to impede the penetration of a computing network by a malicious hacker. Generally, a firewall inspects incoming packets of data in order to detect patterns of information known to be associated with the activities of a malicious hacker. The patterns can be detected statically by referencing to known table of patterns, or dynamically according to the stateful inspection of packets.

Managing network access only partially addresses the requirements of network security for a computing network. File access also must be managed so as to permit only authorized users to access and manipulate files within a file system. Whereas in network access, the content of information flowing into and out from the network forms the basis of security management, for file system file access, user rights and access control policies own the day. Specifically, the ability of a user to access a file within the file system largely depends upon the rights assigned to the user and the permissions associated with the file.

While addressing file system security from the perspective of the identity of the user seeking access to a file remains a sensible proposition, exclusively doing so ignores the reality that application code can maliciously impede the operation of a computing environment equally as effectively as a malicious minded end user. Worse yet, application code can impart its damage upon the file system irrespective of the sophistication and knowledge of the end user invoking the execution of the application code. Yet, access control for a file system exclusively relies upon end user associated permissions. Accordingly, file system access remains a point of vulnerability in the computing enterprise.

BRIEF SUMMARY OF THE INVENTION

Embodiments of the invention address deficiencies of the art in respect to file system access and provide a novel and non-obvious method, system and apparatus for a file system firewall. In one embodiment of the invention, a data processing system configured for file system access can be provided. The data processing system can include a file system, an operating system, a set of access rules, each of the access rules having an associated rule key, and a file system firewall disposed between the file system and the operating system. The file system firewall can include program code enabled to permit or deny a file system request according to an access rule in the set of access rules associated with a rule key formed from an application based attribute in the file system request.

In one aspect of the embodiment, the associated rule key can be formed from an application identifier for a requesting application. In another aspect of the embodiment, the associated rule key can be formed from an application identifier for a requesting application and a user identifier for the requesting application. In yet another aspect of the embodiment, the associated rule key can be formed from an application identifier and a request type. In the latter circumstance, the request type can include a request type selected from the group consisting of a file open request type, a file read request type, a file write request type and a file delete request type.

In another embodiment of the invention, a file system firewall method can be provided. The method can include receiving a file system access request for a file in a file system, identifying from the request, at least one application based attribute, forming a rule key from the at least one application based attribute, locating an access rule with the rule key, and permitting access to the file in the file system only if permitted by the access rule and otherwise denying access to the file. The method further can include failing to locate an access rule with the rule key, prompting an end user with a choice to permit or deny access to the file, and permitting access to the file in the file system only if permitted by the end user. The method yet further can include prompting the end user to persist the choice as a rule, and creating a rule for the choice, associating the rule with the rule key and storing the rule for subsequent location only if the end user has chosen to persist the choice as a rule.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide a method, system and computer program product for a file system firewall. In accordance with an embodiment of the present invention, a file system firewall can be coupled to a file system in a computing environment. The file system firewall can intercept file access requests and can extract from the requests, request attributes, such as the requesting application and an application user. For each of the requests, a key can be formed from selected ones of the attributes and applied to a set of access rules to locate a specific rule for the request. Thereafter, the request can be permitted only if permitted by the located rule. Otherwise, the request can be denied. In this way, application based security can be applied to files in the file system.

Figure 1:
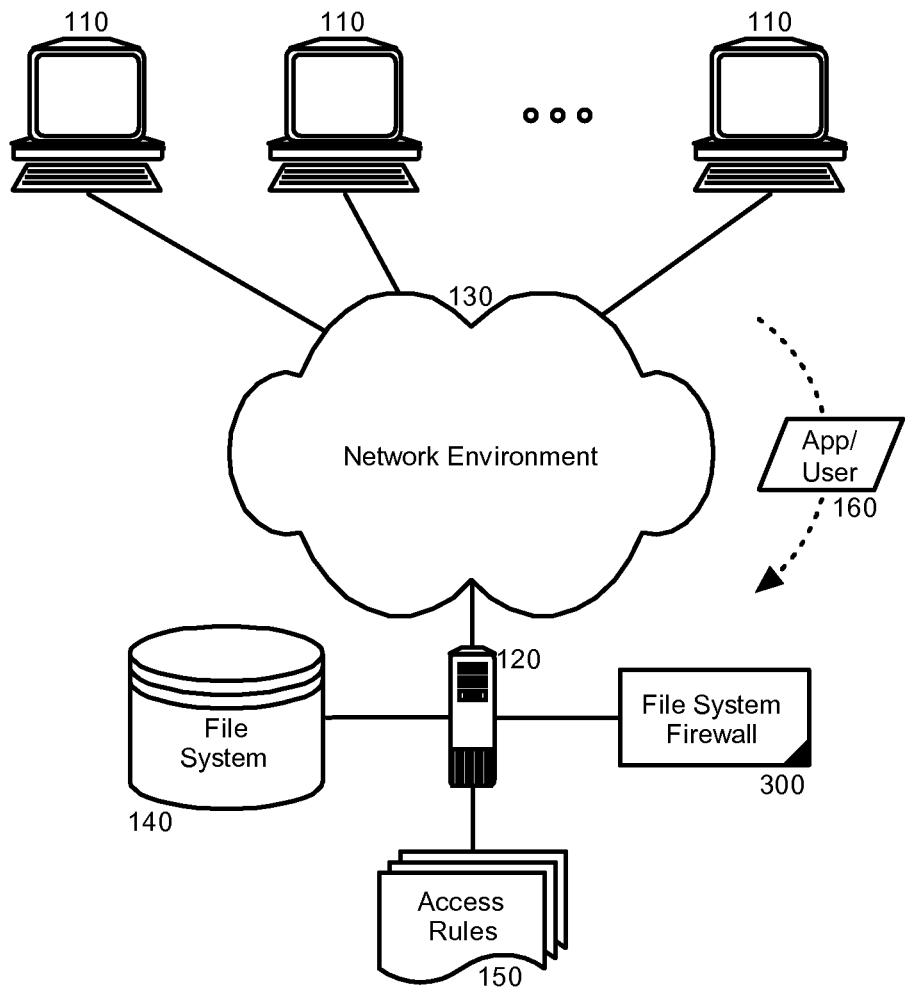
FIG. 1 is a schematic illustration of a data processing system configured with a file system firewall.

In further illustration, FIG. 1 is a schematic illustration of a data processing system configured with a file system firewall. As shown in FIG. 1, the data processing system can include one or more client computing devices 110 coupled to a host computing platform 120 in a network environment 130. The client computing devices 110 can host the operation of applications (not shown) seeking access to files a file system 140 managed by the host computing platform 120. The access to the files in the file system 140 generally can include requests to open, read, write and delete files in the file system 140.

File system firewall logic 300 can be coupled to the host computing platform 120. The file system firewall logic 300 can include program code enabled to apply access rules 150 to requests to access the files in the file system 140 as issued by applications executing in the client computing devices 110. Specifically, the program code of the file system firewall 300 can be enabled to locate an applicable rule for a file system access request based upon one or more attributes 160 provided in the file system access request, such as the application identifier and the user identifier. Where no rules exist for a particular request, the requesting end user can be prompted to establish the rule, or to permit a one time decision as whether to permit or deny the request.

Figure 2:
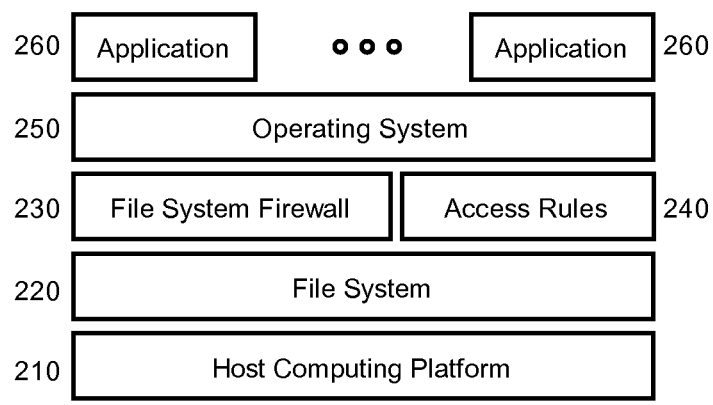
FIG. 2 is a block diagram of a data processing system configured with a file system firewall; and, FIG. 3 is a flow chart illustrating a processing for managing access to files in a file system in a file system firewall.

In more particular illustration, FIG. 2 is a block diagram of a data processing system configured with a file system firewall. The data processing system can include a host computing platform 210 including sufficient processing hardware to enable the operation of a file system 220. An operating system 250 can be coupled to the file system 220 and can support the execution of one or more applications 260. The operating system 250 further can moderate file system access requests from the applications 260, passing those requests to the file system 220.

A file system firewall 230 can be disposed between the operating system 250 and the file system 220 and can limit access to files in the file system 220 based upon access rules 240 associated with the file system firewall. Specifically, the file system firewall 230 can locate one or more applicable rules among the access rules 240 based upon attributes identifiable within any given file system request. The applicable rules particularly can relate to the identity of the application itself so as to apply an application-based rule to the file system request. The applicable rules further can relate to the file system directory in which the requested file exists.

Figure 3:
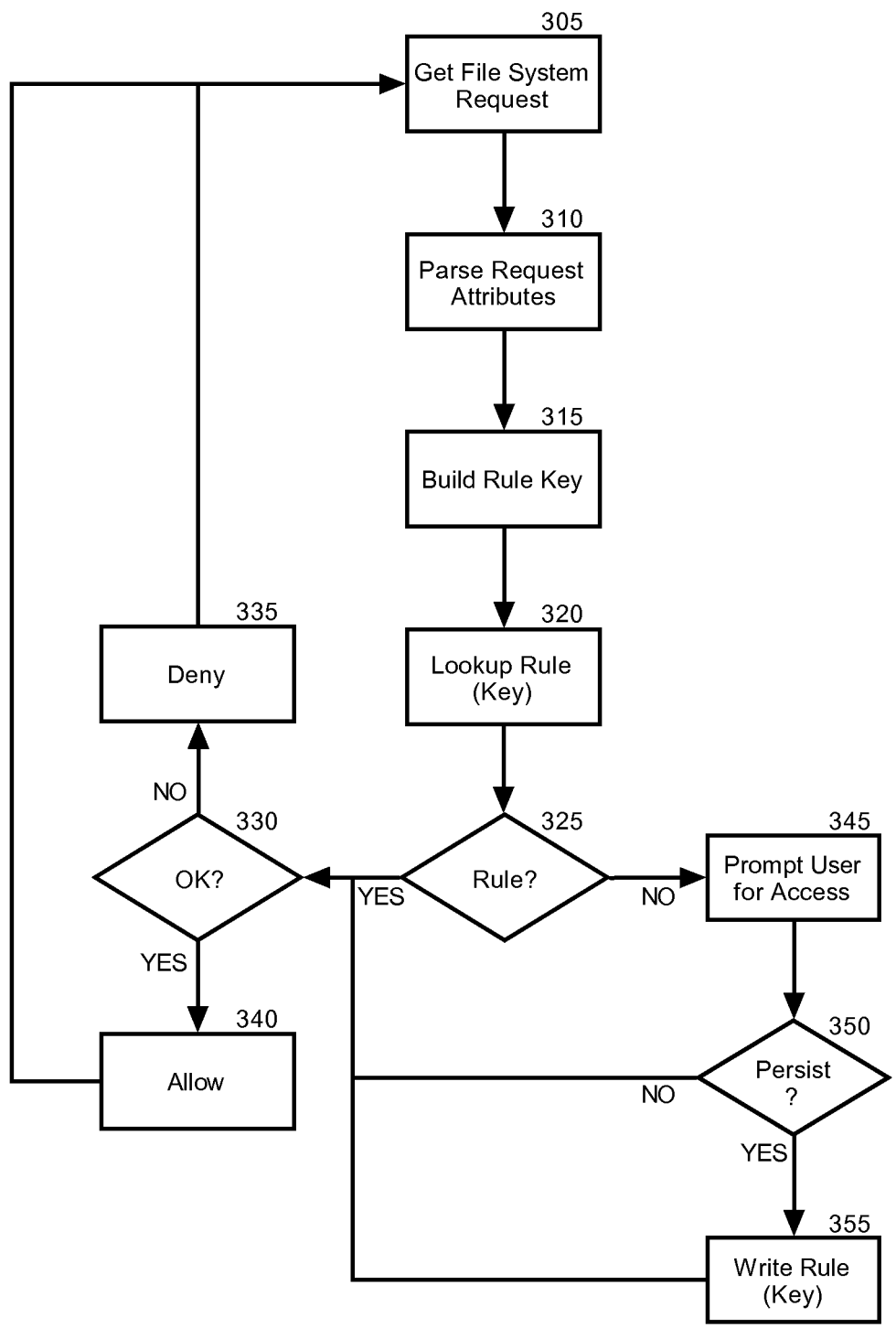

In yet further illustration, FIG. 3 is a flow chart illustrating a processing for managing access to files in a file system in a file system firewall. Beginning in block 305, a file system request can be received in the file system firewall. In block 310, the request attributes can be identified, including requesting application identity, end user identity, file system directory for the requested file, and request type, such as a file open request type, a file read request type, a file write request type, and a file delete request type, to name only a few request types. In block 315, a rule key can be constructed based upon one or more of the request attributes. Notably, in one aspect of the invention, the applicable rules for a file system request can incorporate the file system directory attribute for the requested file to limit write access only to those files within the installation directory and sub-directories for a requested file, but otherwise only to allow read access to the remaining directories including those directories containing system libraries.

Thereafter, in block 320, a lookup can be performed on a set of access rules using the rule key as a key. In decision block 325, if a rule is located, in decision block 330 it can be determined whether to permit or deny the access request. In the case of a denial, the process can continue through block 335. Otherwise, the process can continue through block 340. In decision block 325, if a rule cannot be located for the given rule key, in block 345, the end user can be prompted to indicate whether or not to permit the access request. The prompt additionally can include a user interface element indicating whether or not to persist the choice of the end user as a rule. In decision block 350, if the end user determines to persist the choice as a rule, in block 355, the choice can be written to the set of rules with the rule key. In either case, in decision block 330, if the end user chose to deny the file system request, in block 335 the request can be denied. Otherwise, in block 340 the request can be permitted.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A data processing system configured for file system access, the data processing system comprising:

a processor;

a file system;
an operating system;
a set of access rules, each of the access rules having an associated rule key; and,
a file system firewall disposed between the file system and the operating system, the file system firewall comprising program code enabled to receive from a requesting application a file system access request, to determine an application identifier of the requesting application within the file system access request, to form a rule key from the determined application identifier of the requesting application, to permit or deny the file system access request according to an access rule in the set of access rules associated with the rule key.

2. The system of claim 1, wherein the associated rule key is formed from the application identifier for the requesting application and a user identifier for the requesting application.

3. The system of claim 1, wherein the associated rule key is formed from the application identifier and a request type.

4. The system of claim 1, wherein the associated rule key is formed from the application identifier and a file system directory for a requested file.

5. The system of claim 3, wherein the request type comprises a request type selected from the group consisting of a file open request type, a file read request type, a file write request type and a file delete request type.

6. A file system firewall method comprising:
receiving from a requesting application a file system access request for a file in a file system;
identifying from the file system access request an application identifier of the requesting application;
forming a rule key from the identified application identifier;
locating an access rule with the formed rule key; and,
permitting access to the requested file in the file system only if permitted by the located access rule and otherwise denying access to the requested file.

7. The method of claim 6, further comprising:
failing to locate an access rule with the rule key;
prompting an end user with a choice to permit or deny access to the file; and,
permitting access to the file in the file system only if permitted by the end user.

8. The method of claim 7, further comprising:
prompting the end user to persist the choice as a rule; and,
creating a rule for the choice, associating the rule with the rule key and storing the rule for subsequent location only if the end user has chosen to persist the choice as a rule.

9. The method of claim 6, wherein the rule key is formed from the application identifier and an identifier of an associated end user.

10. The method of claim 6, wherein the rule key is formed from the application identifier and a type for the file system access request.

11. The method of claim 6, wherein the rule key is formed from the application identifier and a file system directory for the requested file.

12. The method of claim 6, wherein the rule key is formed from the application identifier, an identifier of an associated end user, and a type for the file system access request.

13. A computer program product comprising a computer usable tangible storage device embodying computer usable program code for a file system firewall the computer program product comprising:
computer usable program code for receiving from a requesting application a file system access request for a file in a file system;
computer usable program code for identifying from the file system access request an application identifier of the requesting application;
computer usable program code for forming a rule key from the identified application identifier;
computer usable program code for locating an access rule with the formed rule key; and,
computer usable program code for permitting access to the requested file in the file system only if permitted by the located access rule and otherwise denying access to the requested file.

14. The computer program product of claim 13, further comprising:
computer usable program code for failing to locate an access rule with the rule key;
computer usable program code for prompting an end user with a choice to permit or deny access to the file; and,
computer usable program code for permitting access to the file in the file system only if permitted by the end user.

15. The computer program product of claim 14, further comprising:
computer usable program code for prompting the end user to persist the choice as a rule; and,
computer usable program code for creating a rule for the choice, associating the rule with the rule key and storing the rule for subsequent location only if the end user has chosen to persist the choice as a rule.

16. The computer program product of claim 13, wherein the rule key is formed from the application identifier and an identifier of an associated end user.

17. The computer program product of claim 13, wherein the rule key is formed from the the application identifier and a type for the file system access request.

18. The computer program product of claim 13, wherein the rule key is formed from the application identifier and a file system directory for the requested file.

19. The computer program product of claim 13, wherein the rule key is formed from the application identifier, an identifier of an associated end user, and a type for the file system access request.

* * * * *